(12) United States Patent
Schlick et al.

(10) Patent No.: US 6,975,265 B2
(45) Date of Patent: Dec. 13, 2005

(54) METHOD AND DEVICE FOR SELF-CALIBRATION OF A RADAR SENSOR ARRANGEMENT

(75) Inventors: Michael Schlick, Pfinztal (DE); Juergen Hoetzel, Florstadt (DE); Rainer Moritz, Filderstadt (DE); Berndhard Lucas, Besigheim (DE); Tore Toennesen, Reutlingen (DE); Hermann Winner, Bietigheim (DE); Werner Uhler, Bruchsal (DE); Dirk Schmidt, Besigheim (DE)

(73) Assignee: Robert Bosch GmbH, Stuttgart (DE)

(*) Notice: Subject to any disclaimer, the term of this patent is extended or adjusted under 35 U.S.C. 154(b) by 43 days.

(21) Appl. No.: 10/477,958

(22) PCT Filed: Mar. 6, 2002

(86) PCT No.: PCT/DE02/00812

§ 371 (c)(1),
(2), (4) Date: Apr. 15, 2004

(87) PCT Pub. No.: WO02/095443

PCT Pub. Date: Nov. 28, 2002

(65) Prior Publication Data

US 2004/0189514 A1    Sep. 30, 2004

(30) Foreign Application Priority Data

May 22, 2001  (DE)  ................ 101 24 909

(51) Int. Cl.$^7$ ............................................. G01S 7/40
(52) U.S. Cl. ........................ 342/165; 342/174; 342/70
(58) Field of Search ........................... 342/165, 173, 342/174, 70–72, 107–109, 111, 113–118, 342/126, 133, 139, 146

(56) References Cited

U.S. PATENT DOCUMENTS

| 5,285,209 | A  | * | 2/1994 | Sharpin et al. ............. 342/424 |
| 6,614,388 | B2 | * | 9/2003 | Klinnert et al. ............. 342/70 |
| 6,762,712 | B2 | * | 7/2004 | Kim ............................ 342/135 |
| 2002/0067304 | A1 | * | 6/2002 | Klinnert et al. ............. 342/118 |
| 2003/0025631 | A1 | * | 2/2003 | Kim ............................ 342/198 |

FOREIGN PATENT DOCUMENTS

DE         44 42 189 A1      5/1996

(Continued)

OTHER PUBLICATIONS

"A calibration technique for polarimetric coherent-on-receive radar systems", Nashashibi, A.; Sarabandi, K.; Ulaby, F.T. Antennas and Propagation, IEEE Transactions on vol. 43, Issue 4, Apr 1995 P(s):396-404.*

Primary Examiner—John B. Sotomayor
(74) Attorney, Agent, or Firm—Michael J. Striker

(57) ABSTRACT

A method and an apparatus for operating a radar sensor system with a number of adjacent individual sensors (3, 4, 5, 6), extensively synchronized with one another, for determining the position of a target object (15) are proposed. In one measurement cycle, the transit time of the radar signal emitted from one individual sensor and reflected by the target object to this individual sensor (3, 4, 5, 6) (direct echo (13, 14)) and to a different individual sensor (3, 4, 5, 6) (cross echo (16)) is evaluated. From the evaluation of the direct and cross echoes (13, 14, 16), at least the position of the target object (15) is determined, and a detection quality signal (Q) is ascertained, and once a predetermined amount of the detection quality signal (Q) is reached for a target object (15), a calibration is performed.

9 Claims, 1 Drawing Sheet

FOREIGN PATENT DOCUMENTS

| | | | |
|---|---|---|---|
| DE | 10049906 A  * | 10/2000 | |
| DE | 100 49 906 | 4/2002 | |
| EP | 0 928 428 A | 7/1999 | |
| EP | 1 058 126 A | 12/2000 | |
| EP | 1 058 126 A2 | 12/2000 | |
| WO | 98/15847 | 4/1998 | |

* cited by examiner

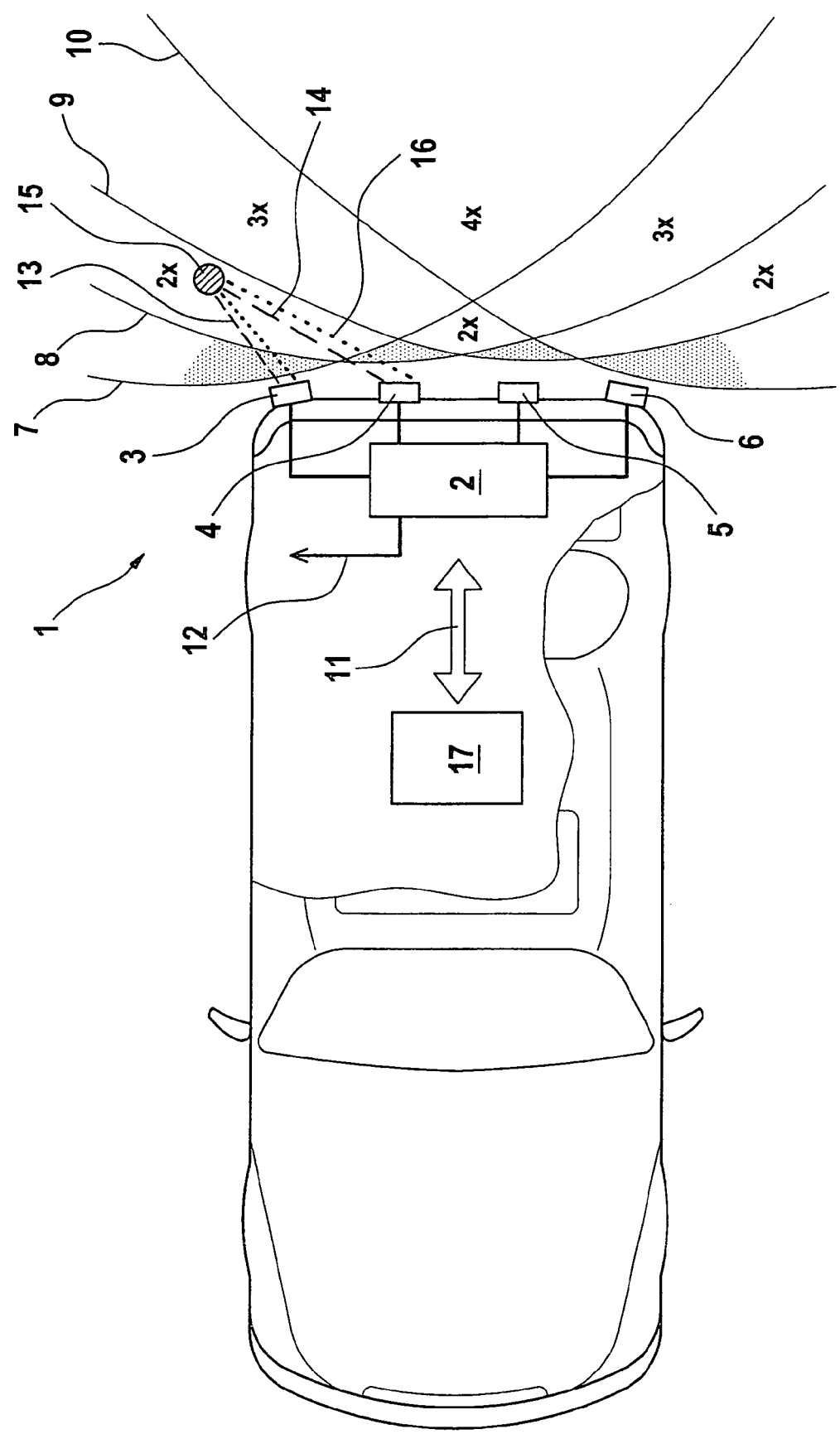

METHOD AND DEVICE FOR SELF-CALIBRATION OF A RADAR SENSOR ARRANGEMENT

PRIOR ART

The invention relates to a method and an apparatus for operating a radar sensor system, such as a pulse echo radar or a radar system with a so-called binary phase shift key (BPSK) or pseudo-noise (p/n) coding, particularly for calibrating an array of a plurality of individual sensors, in accordance with the generic characteristics of the main claim.

From German Patent Disclosure DE 44 42 189 A1, for instance, in a system for measuring distance in the vicinity of motor vehicles, it is known to use sensors with sending and receiving units for both sending and receiving information simultaneously. With the aid of the distance measurement, passive measures for the vehicle can be activated, for instance in the event of a head-on, side, or rear-end collision. By an exchange of the information detected, traffic situations can for instance be assessed in order to activate appropriate tripping systems.

For reliable triggering of the aforementioned passenger protection systems in a motor vehicle, as a rule many radar sensors are needed for the individual conflict situations in the vicinity of the motor vehicle. Detecting and monitoring traffic, particularly close to the vehicle, with ranges of about 10 meters can moreover be useful in many further applications. These include help in parking, in checking the so-called "blind spot", and in "stop and go" traffic, in which the distance from the vehicle ahead is ascertained to allow stopping and starting to be done automatically. Typically, many radar sensors, each with different demands adapted to the measurement task, are used.

Each individual radar sensor, because of the wide-angle directional characteristic and hence a lack of angular resolution, can determine only the one-dimensional radial distance from objects to the sensor, but cannot determine the two-dimensional position of the objects in the plane of the vehicle motion. It is therefore necessary to use these radar sensors in groups, so that by so-called radar triangulation, the object positions in the travel plane can be determined. In so-called active triangulation, this leads to many points of intersection of concentric circles around the radar sensors, whose radii correspond to the distances measured. The actual object positions must then be extracted by eliminating the excess intersecting points, for instance using complicated tracking algorithms.

In so-called passive triangulation, the signals from an emitting sensor reflected by an object are received again by an adjacent sensor and evaluated. Thus it is possible to determine the position of an object, and simultaneously to measure the object contour, by evaluating cross echoes. The transit time of the signal from the sending sensor to the receiving sensor then allows an elliptical curve in the travel plane, on which curve the object is located, to be calculated. Together with the distances determined from the direct echoes, the position and approximate geometric shape can then be calculated.

In German Patent Disclosure DE 100 49 906.6, which had not yet been published by the priority date of the present application, a method is for instance described with which the cross echo evaluation is performed in pulse radar sensors with the aid of random coding. In this pulse echo radar system, a carrier signal of a microwave emitter is transmitted in pulsed form at a predetermined pulse repetition rate. This microwave signal is reflected from a target object, and in a mixer circuit, the position of the target object is derived from the time when the pulse was emitted and when the reflected radiation arrived. Advantageously, by means of a randomly controlled switch, the pulses are emitted only with a predetermined probability, and for evaluation of the received signals, the random pulse trains of the sender are then known in the receiver. By means of this coding, it is also possible to distinguish between a plurality of signals sent.

All the conventional methods of passive triangulation require an exact chronological synchronization of the individual sensors within one group, because otherwise the transit times of the cross echoes cannot be determined correctly. Particularly in a method that uses coding, the clock generators with which the pulse trains in the individual sensors are generated must operate very precisely synchronously. The requisite precision is derived from the allowable tolerance in the distance measurement, which is typically 3 cm. If the cross echo travel is to be determined with this precision, the transit time of the electromagnetic wave in air must be capable of being determined with a chronological precision of approximately 100 ps.

Synchronous operation of spatially separated clock generators with this high precision over a relatively long period of time is possible only by transmitting a reference pulse within the sensor group. In that case, however, stringent demands are made of the precision of the reference pulse within one sensor group. Above all, the phase relationship of the clock signal is critical. For instance, if a clock signal with a frequency $f_T=5$ MHz is used, which is equivalent to the pulse repetition rate of 24 GHz radar sensors, then an angular deviation of only 0.36° already suffices to cause an error of 6 cm in the cross echo travel measurement.

The phase angle errors described above can readily be caused by a number of factors. For instance, in transmission over connecting lines, the pulse edges become blurred, above all for reasons of EMC (EMC=electromagnetic compatibility). To reconstruct the trigger edges, comparators are used, and the comparator threshold and thus the phase relationship of the clock pulse is then subject to such factors as fluctuations in temperature and operating voltage as well as aging effects. The signal transit time within the comparators and the switching speed of any further gates that may be present in the signal path of the reference pulse are then likewise temperature-dependent and are subject to so-called drifting effects. The steepness of the pulse edges also affects the phase relationship of the trigger signal and depends on the line impedance, the capacitances, and the resistances of the RC networks involved and possible other components. All of these physical properties are likewise temperature-dependent and subject to aging effects.

Electromagnetic irradiations on the clock lines can generate noise levels that cause additional errors in the reconstruction of the trigger edges. Although the transmission is more resistant to phase errors the higher the selected clock frequency, nevertheless the then-required clock frequencies in the GHz range require relatively expensive components with high current consumption, and at high clock frequencies, for EMC reasons, shielded lines are moreover necessary.

By means of optical transmission of the clock pulse, using optical waveguides, which is also expensive, it is true that EMC problems can be avoided, but factors resulting from fluctuating gate transit times and switching thresholds in the electrical/optical/electrical conversion are still operative. To eliminate these harmful factors, great effort is required, which entails considerable costs for material.

ADVANTAGES OF THE INVENTION

The method described at the outset for operating a radar sensor system with a number of adjacent individual sensors extensively synchronized with one another for determining the position of a target object is advantageously further developed with the characteristics of the main claim, to enable reliable, fast calibration.

First, according to the invention, a determination of possible target object positions is performed by so-called active triangulation, that is, forming the intersecting points of circles of all direct echoes. In a simple way, the transit time of each radar signal sent by one individual sensor and reflected back by the target object to this individual sensor is evaluated as a direct echo. Depending on how many individual sensors simultaneously detect one target object, a more or less precisely determined likely object position in the detection plane is then obtained.

In the same measurement cycle, the transit time of the radar signal sent by one individual sensor and reflected from the target object to a different individual sensor is then evaluated as a cross echo, further increasing the redundancy of the measurements. With high redundancy, it is then advantageously possible to draw conclusions about the shape and position of the target objects in the plane; in an application in a motor vehicle, these target objects are for instance a post or a wall.

In a respective measurement cycle, from the evaluation of the direct and cross echoes, it is then possible for at least the position and optionally also the shape of the target object to be determined. Moreover, according to the invention, a detection quality signal is ascertained, and once a predetermined amount of the detection quality signal is reached for a determined target object, calibration can then be performed. From the deviation between the position of target object ascertained from the direct echoes and its position ascertained from the cross echoes, a correction variable for the cross echoes is thereupon ascertained.

It is especially advantageous if the reflected positions of the target object are tracked over a plurality of measurement cycles, and if so-called implausible reflections are eliminated with the aid of a so-called motion-model-supported method or by exploiting the redundancy intrinsic to simultaneous detection using three or more individual sensors.

The assessment of the detection quality signal for each object position found for a target, with a quality index Q that expresses the certainty with which the position of an object has been determined in the plane, is as a rule dependent on the signal quality, the number of individual sensors involved, and the stability of the position detection over a plurality of measurement cycles. During operation of the sensor system, target objects will occur again and again that generate very strong, stable radar reflections, which in turn lead to a high quality index Q in the position determination. Whenever such a target object is detected, the calibration steps according to the invention can be performed for the cross echo evaluation.

With an apparatus of the invention, the above-described calibration process can advantageously be performed. To that end, a microwave radar system as the sensor system is constructed with an array of a plurality of individual sensors, whose detection regions overlap at least partially. The sensor system is connected, via a bus system or a point-to-point connection of the individual sensors, with a programmable microprocessor-controlled evaluation and control unit and to a memory for the measured and calculated data as well as for storing a corresponding data processing program for the calculation and estimation procedures.

A data processing program of this kind for a microprocessor-controlled data processing system can advantageously have individual program steps with which the measured values and the calculated values for the direct and cross echoes are evaluated and the correction variable is then calculated. These calibration steps run in the background and do not affect the course of the ongoing measurement. For the method of the invention, all that is needed is that the measured direct-echo and cross-echo distances of the target object be capable of being stored and traced back over a plurality of measurement cycles.

The calibration process is then executed, as described below. Once the first prerequisite is present, which is that a target object has been detected with high signal quality Q and cross echoes have entered into the position determination, the question is asked whether the object position can be determined precisely solely from the direct echoes of the past measurement cycles, without using the cross echoes. If this condition is not met, the calibration process is discontinued, and normal measurement operation is continued. However, if the condition is met, then a comparison is made between the position that can be determined solely from the direct echoes and the position determined from direct and cross echoes. If there is a difference, then by a conventional estimation process, for instance using a Kalman filter or a so-called least square estimator, the measurement error in the cross echoes is determined. From the measurement errors, the correction variables with which all subsequent cross echo measurements are then corrected are derived.

Thus during operation, the method of the invention leads successively to optimizing the measurement precision of detecting the target object and can compensate for the influences of slowly changing variables, such as a temperature drift and aging of the components, on the precision of the reference pulse transmission, mentioned in the background section, for the individual sensors.

In one advantageous embodiment of the method of the invention, it is furthermore possible to perform a basic setting of the phase of the reference pulse of the entire sensor system with the individual sensors, after an installation of a new radar system, for instance in a motor vehicle. All that is required is a low-reflection space or a free surface without randomly detectable objects and a well-defined reference object, which is to be considered as a point, such as a radar triplane.

This basic calibration can then proceed as follows. The reference target object is fixed in a position in which it can be detected simultaneously by a plurality of individual sensors, so that the basic calibration mode can be started. For determining the position of the object, first only the direct echoes are evaluated, and from the direct echoes the exact position of the reference target object is determined. Next, from the object position, the theoretical transit time of the cross echoes can be calculated, and then the actual transit time of the cross echoes is measured, with all their imprecisions or offsets.

From the differences between the theoretical and the actual transit times, the correction variables are then formed, which are made the basis for all subsequent cross echo measurements. This sequence can be repeated with various object positions as many times as needed until all the possible cross echo travel distances have been traversed.

In summary, it can be stated that with the invention, a model-based method for compensating for hardware tolerances in a radar sensor system with a plurality of individual sensors has been created in a simple way; in evaluation by so-called triangulation methods, the phase errors in the reference pulse transmission are corrected, thus making high-precision determination of the cross echo travel possible, despite imprecisions that might be present in the reference pulse.

Automatic calibration of the cross echo evaluation of these radar sensor groups can be done by software in the sensor control and evaluation unit. Moreover, a basic calibration that is simple to perform is possible at the end of the production process of the sensor system, for instance in a motor vehicle, by scanning a reference target object. An also easily performed constant automatic fine calibration with the aid of strong radar reflections during operation compensates for adulterating temperature factors and other drifting, so that during the service life of the sensor system, no manual adjustment or maintenance whatever is needed to maintain the precision of the cross echo travel measurement. As already noted, no high-precision reference pulse is needed for synchronizing the individual sensors, and so an inexpensive embodiment, at little cost for hardware, suffices.

These and other characteristics of preferred refinements of the invention will become apparent not only from the claims but also from the description and the drawings; the individual characteristics can each be realized alone or a plurality of them can be realized in the form of subsidiary combinations in the embodiment of the invention and in other fields and can represent both advantageous and intrinsically patentable embodiments for which patent protection is here claimed.

DRAWING

The sensor system of the invention will be described in terms of an advantageous exemplary embodiment in the drawing, in which the sole FIGURE is a schematic illustration of a group of four individual sensors, whose detection regions overlap, in a radar sensor system.

DESCRIPTION OF THE EXEMPLARY EMBODIMENT

In the drawing, a block circuit diagram is shown of a sensor system 1 with a sending and receiving component group 2 of a microwave radar system. The sending and receiving component group 2, not described in detail here, is provided with four individual sensors 3, 4, 5, and 6, which have partly overlapping detection regions 7, 8, 9, and 10. The sensor system 1 is connected here, via a bus system 11, such as a CAN bus, to a conventional microprocessor-controlled control and evaluation unit 17, not otherwise described, and also has a terminal 12 for an energy supply.

The individual sensors 3, 4, 5 and 6, in a manner known per se, have a sending oscillator for the carrier signal, for instance at a frequency of 24 GHz, for emitting a radar signal that is for instance pulsed or is modified by other methods, such as BPSK or p/n, and at a receiver input they detect the received signal reflected by a target object located in at least one detection region 7–10. The received signal is carried to a mixer, and the carrier signal of the sending oscillator is also applied to this mixer.

Since the signal (direct echo) reflected from the target object and received at the respective input of the sending individual sensor 3–6 has a transit time, determined by the distance of the target object, between the emission and reception, a distance-dependent signal can be obtained by the mixture, and the distance of the target object can be determined. In the drawing, one such direct echo 13 of a target object 15 is shown for the individual sensor 3 and a direct echo 14 is shown for the individual sensor 4, as examples. In the same measurement cycle, the transit time of the radar signal, emitted by one of the individual sensors 3–6 and reflected by the target object (such as 15) to a different one of the individual sensors 3–6 can also be evaluated, each as a cross echo, from which conclusions can be drawn as to the shape and position of the target objects in the detection plane 7–10, an example of an object being a post or a wall, in an application in a motor vehicle. For the sake of clarification, a cross echo 16 of the reflected signal of the target object 15, emitted by the individual sensor 3 and received by the individual sensor 4, is shown in detail as a dotted line.

From the detection regions 7–10, it can be seen that in the regions outlined in dashed lines, a target object would be detected for distance measurement by only one individual sensor 3–6, and this region would thus not be available for a precise evaluation. In the other overlapping regions, any target objects present are shown along with the number of their detection possibilities by the individual sensors 3–4, namely 2×, 3× or 4×. With this multiple detection, it is thus possible by a so-called triangulation process also to perform lateral detection and hence two-dimensional position determination as well, and possibly even the determination of the shape of the target object.

With the sensor system 1 of the exemplary embodiment, automatic calibration of the synchronized individual sensors 3–6 and basic calibration are possible. The determination of possible target object positions is done first by active triangulation, that is, formation of the intersection points of circles of all direct echoes. Depending on the number of individual sensors 3–6 that simultaneously detect the target object, a more or less precisely determined likely object position results in the detection regions 7–10 shown in the drawing.

Next, as explained in detail in the above description of the invention, the evaluation of the cross echoes is done, so that with high redundancy of measurements, conclusions can be drawn about the shape and position of the target objects in the plane of the detection regions. Whenever a target object has been found with an adequate detection quality signal Q, which expresses the certainty with which the position of the target object in the plane was determined, the calibration method of the invention is started. These target objects are for instance detected four times (4×) and generate sufficiently strong, stable radar reflections, which then lead to a high detection quality signal Q.

If the position, for instance of the target object 15, can then be determined precisely from the direct echoes of the previous measurement cycles without using the cross echo, then a comparison is performed of the position 15 that can be determined solely from the direct echoes 13, 14 with the position determined from direct and cross echoes 13, 14 and 16. If there is a difference, the measurement error involved in the cross echoes 16 etc. is determined by a conventional estimation process. From the measurement errors, the correction variables with which all subsequent cross echo measurements are corrected are then derived.

What is claimed is:

1. A method for operating a radar sensor system, having a number of adjacent individual sensors (3, 4, 5, 6), extensively synchronized with one another, for determining the position of a target object (15), in which in one measurement cycle, the transit time of each radar signal, emitted by an individual sensor and reflected back from the target object to this individual sensor (3, 4, 5, 6), is evaluated as a direct echo (13, 14);

in the same measurement cycle, the transit time of each radar signal, emitted by one individual sensor (3, 4, 5, 6) and reflected from the target object (15) to a different individual sensor (3, 4, 5, 6), is evaluated as a cross echo (16);

from the evaluation of the direct and cross echoes (13, 14, 16), at least the position of the target object (15) is determined, and a detection quality signal (Q) is ascertained; and in which after a predetermined amount of the detection quality signal (Q) for a target object (15), a calibration is performed by providing that from the deviation in the position of the target object (15) ascertained from the direct echoes (13, 14) and its position ascertained from the cross echoes (16), a correction variable for the cross echoes (16) is ascertained.

2. The method of claim 1, characterized in that the evaluation of the direct and cross echoes (13, 14, 15) is effected over a plurality of measurement cycles, and the respective values are buffer-stored; and that implausible positions of target objects (15) are precluded by means of a comparison with a motion model or by utilizing the redundancy intrinsic to the many measurements.

3. The method of claim 1, characterized in that the detection quality signal (Q) is ascertained from the signal quality of the direct and cross echoes (13, 14, 15) received, the number of individual sensors (3, 4, 5, 6) involved in the position determination by means of cross echoes (16), and/or the stability of the position determination over a plurality of measurement cycles.

4. The method of claim 1, characterized in that upon attaining the predetermined detection quality signal (Q), the question is asked whether the position of the target object (15) can be determined solely from the direct echoes (13, 14) of the measurement cycles performed previously, and only if this condition exists is the calibration performed.

5. The method of claim 1, characterized in that from the deviation in the position of the target object (15) ascertained from the direct echoes (13, 14) and its position ascertained from the cross echoes (16), the respective measurement error is determined by an estimation process, from which the correction variable with which all the subsequent measured values of the cross echoes (16) are corrected is derived.

6. The method of claim 1, characterized in that a basic calibration of the radar sensor system (1) is performed with the following method steps:

a reference target object is disposed such that it can be detected simultaneously by a plurality of individual sensors (3, 4, 5, 6);

the position of the reference target object is determined by a measurement of the direct echoes (13, 14) of all the individual sensors;

from the thus-measured position of the reference target object, the theoretical transit time of the cross echoes (16) to be expected is calculated;

the actual transit time of the detectable cross echoes (16) is measured;

from the deviation between the theoretical and the actual transit time, the correction variable is formed that is made the basis for all the subsequent cross echo measurements.

7. The method of claims 6, characterized in that the method steps are repeated with different positions of the reference target object, as many times as needed until all the possible cross echoes (16) of the individual sensors (3, 4, 5, 6) involved have been corrected.

8. An apparatus for performing the method of claim 1, characterized in that a microwave radar system as the sensor system (1) is constructed with an array of a plurality of individual sensors (3, 4, 5, 6), whose detection regions (7, 8, 9, 10) overlap at least partially; and that the sensor system (1) is connected, via a bus system (11) or a point-to-point connection of the individual sensors (3, 4, 5, 6), with a programmable microprocessor-controlled evaluation and control unit (17) and to a memory for the measured and calculated data as well as to a data processing program.

9. A data processing program for a microprocessor-controlled data processing system of claim 8 for performing the method of one of the foregoing claims, characterized in that with the individual program steps, the measured and the calculated values for the direct and cross echoes (13, 14, 15) are evaluated, and the correction variable is calculated.

* * * * *